US012008104B2

(12) United States Patent
Werner et al.

(10) Patent No.: US 12,008,104 B2
(45) Date of Patent: Jun. 11, 2024

(54) TRANSPORT SECURITY IN BUSINESS APPLICATIONS

(71) Applicant: Onapsis Inc., Boston, MA (US)

(72) Inventors: Peter Werner, Heidelberg (DE); Thomas Fritsch, Heidelberg (DE)

(73) Assignee: Onapsis Inc., Boston, MA (US)

( * ) Notice: Subject to any disclaimer, the term of this patent is extended or adjusted under 35 U.S.C. 154(b) by 0 days.

(21) Appl. No.: 17/219,341

(22) Filed: Mar. 31, 2021

(65) Prior Publication Data

US 2021/0303689 A1 Sep. 30, 2021

Related U.S. Application Data

(60) Provisional application No. 63/002,753, filed on Mar. 31, 2020.

(51) Int. Cl.
*G06F 21/57* (2013.01)
*G06Q 10/0631* (2023.01)

(52) U.S. Cl.
CPC ......... *G06F 21/57* (2013.01); *G06Q 10/0631* (2013.01); *G06F 2221/033* (2013.01)

(58) Field of Classification Search
CPC .............. G06F 21/57; G06F 2221/033; G06Q 10/0631

USPC .......................................................... 726/22
See application file for complete search history.

(56) References Cited

U.S. PATENT DOCUMENTS

| | | | |
|---|---|---|---|
| 2002/0188486 A1* | 12/2002 | Gil ........................... | H04L 9/40 705/7.38 |
| 2005/0060662 A1* | 3/2005 | Soares .................... | G06Q 10/06 715/810 |
| 2016/0269312 A1* | 9/2016 | Cavalcante ........... | G06F 9/5072 |
| 2019/0312793 A1* | 10/2019 | Hazen ................. | H04L 41/0893 |
| 2020/0193491 A1* | 6/2020 | Hu ........................ | G06K 9/6256 |
| 2021/0258303 A1* | 8/2021 | Branch ..................... | G06F 8/34 |

OTHER PUBLICATIONS

Felt, "Android Permissions Demystified", Oct. 2011, ACM, pp. 627-637 (Year: 2011).*

* cited by examiner

*Primary Examiner* — Piotr Poltorak
*Assistant Examiner* — Gregory A Lane
(74) *Attorney, Agent, or Firm* — Crowell & Moring LLP

(57) ABSTRACT

Security can be improved in a business application, such as an enterprise resource planning ("ERP") system, by verifying and testing transports within the system or between systems. In one embodiment, a transport is verified by a transport profiler to ensure proper functioning and compliance. In one embodiment, the transport profiler may include visualization functionality for visualizing the transport between systems.

20 Claims, 6 Drawing Sheets

Figure 4

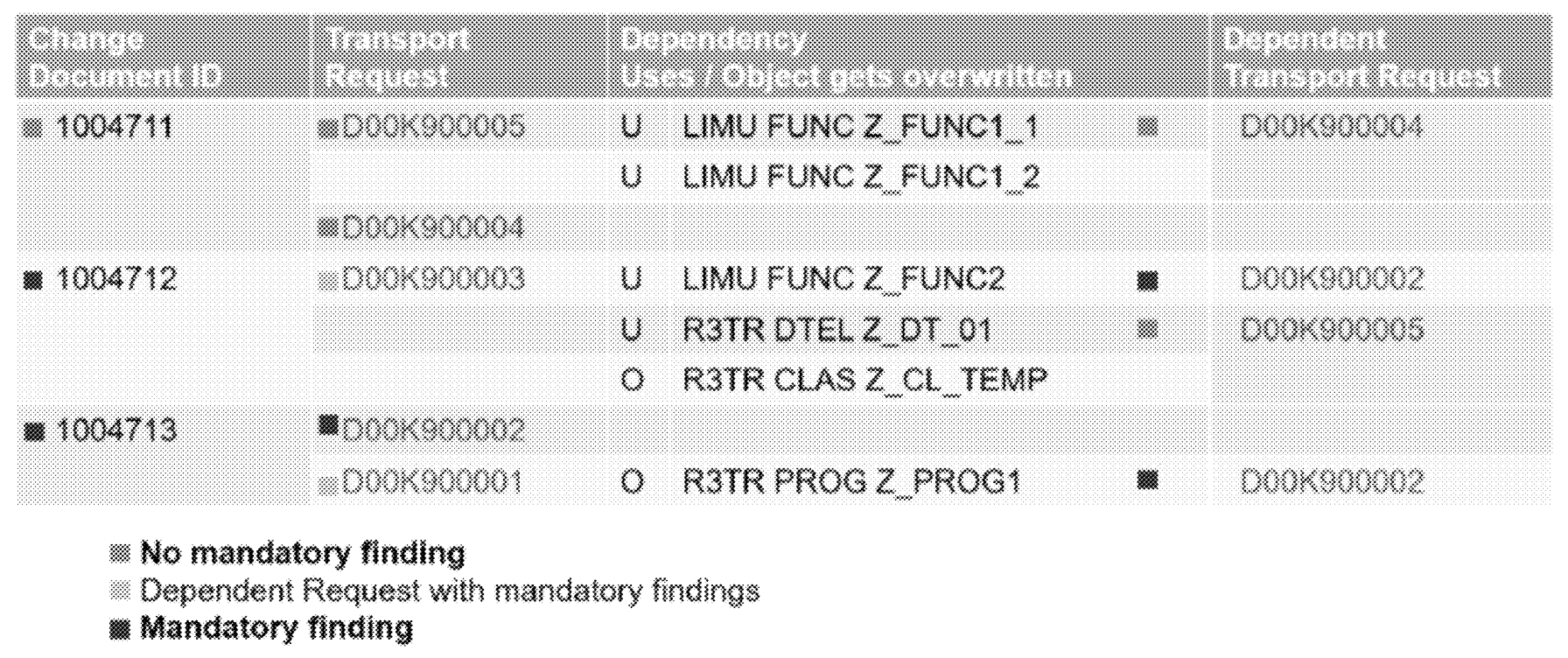

| Change Document ID | Transport Request | Dependency (Key Object / Precondition) | | Dependent Transport Request |
|---|---|---|---|---|
| ■ 1004711 | ■ D00K900005 | U | LIMU FUNC Z_FUNC1_1 | |
| | ■ D00K900004 | U | LIMU FUNC Z_FUNC1_2 | D00K900004 |
| ■ 1004712 | D00K900003 | U | LIMU FUNC Z_FUNC2 | D00K900002 |
| | | U | R3TR DTEL Z_DT_01 | D00K900005 |
| | | O | R3TR CLAS Z_CL_TEMP | |
| ■ 1004713 | ■ D00K900002 | O | R3TR PROG Z_PROG1 | D00K900002 |
| | D00K900001 | | | |

■ No mandatory finding
▨ Dependent Request with mandatory findings
■ Mandatory finding

TRANSPORT SECURITY IN BUSINESS APPLICATIONS

PRIORITY CLAIM

This application claims priority to Provisional patent application No. 63/002,753, filed on Mar. 31, 2020, entitled "TRANSPORT SECURITY IN BUSINESS APPLICATIONS", the entire disclosure is herein incorporated by reference.

TECHNICAL FIELD OF THE INVENTION

The present invention relates to security and verification for applying updates or changes, such as in the transportation of code or applications.

BACKGROUND

Businesses may rely on electronic systems using database technology to manage their key processes. There may be a number of business applications that businesses rely on. One example business application is an Enterprise Resource Planning (ERP) system. Other example business applications include Customer Relationship Management (CRM), Supply Chain Management (SCM), Product Lifecycle Management (PLM), Human Capital Management (HCM), and Business Intelligence (BI). These business applications are in charge of processing sensitive business data and, accordingly, the confidentiality, integrity and availability of this information is therefore critical for the security and continuity of the business. Moreover, all security relevant data of a company or an application is provided in the database system. Therefore, reducing the risk of security leaks or compliance breaches in the database system is a major concern.

Business applications are increasingly connected to external computer systems and are accessible by a continuously growing user base. This means that the exposure of business applications computer systems to external vulnerabilities has grown as well. Business applications are more in the focus of hackers, such that the likelihood for attacks increases. Operating a business system, such as an ERP (e.g. SAP® or Oracle ERP Cloud system), necessitates changes or updates in one system may need to be propagated through multiple systems. However, those changes or updates should be checked and verified to ensure that propagation does not corrupt or damage any of the systems. Software applications which could contain vulnerabilities, unintentionally or on purpose, can lead to security or compliance breaches. If this occurs, the business or the organization running the application is endangered through loss of critical/protected data, loss of reputation, loss of business, lawsuits, etc. Therefore, it is industry best practice today to apply dedicated tools for analyzing the software to effectively mitigate these risks, such as the risks with transporting between systems.

BRIEF SUMMARY

The present invention relates to a method, system or apparatus and/or computer program product for improved security by verifying and testing transports within a business application, such as an enterprise resource planning ("ERP") system. In one embodiment, a transport is verified by a transport profiler to ensure proper functioning and compliance. In one embodiment, the transport profiler may include visualization functionality for visualizing the transport between systems. According to one embodiment, the invention may be implemented in a computer program being loadable in a memory of a computer, wherein the computer program is adapted to carry out the steps of the methods described herein.

BRIEF DESCRIPTION OF THE DRAWINGS

The figures illustrate principles of the invention according to specific embodiments. Thus, it is also possible to implement the invention in other embodiments, so that these figures are only to be construed as examples. Moreover, in the figures, like reference numerals designate corresponding modules or items throughout the different drawings.

FIG. 4 illustrates an import recommendation.

DETAILED DESCRIPTION OF THE DRAWINGS AND PREFERRED EMBODIMENTS

By way of introduction, the disclosed embodiments relate to systems and methods for maintaining security in a system by inspecting and verifying updates and changes provided to the system. The updates and changes may be referred to as transports and may be used in the context of a business application, such as an enterprise resource planning ("ERP") landscape/system. SAP® and Oracle ERP are two examples of an ERP landscape. The business application may include a computer-based database system for managing and planning all resources within an enterprise. Other example business applications include Customer Relationship Management (CRM), Supply Chain Management (SCM), Product Lifecycle Management (PLM), Human Capital Management (HCM), and Business Intelligence (BI). The embodiments described herein relate to the transport system such as between and among business applications. The embodiments apply to business applications and may be described with respect to specific examples, such as an ERP landscape/system.

A transport may be used to implement new features in a destination system. Because changes implemented by transports may not be reversed without issuing a different transport to provide corrections, it is important for security and quality control to verify transports. As described below, a transport profiler operates to verify the changes/updates from a transport.

Figure 1:
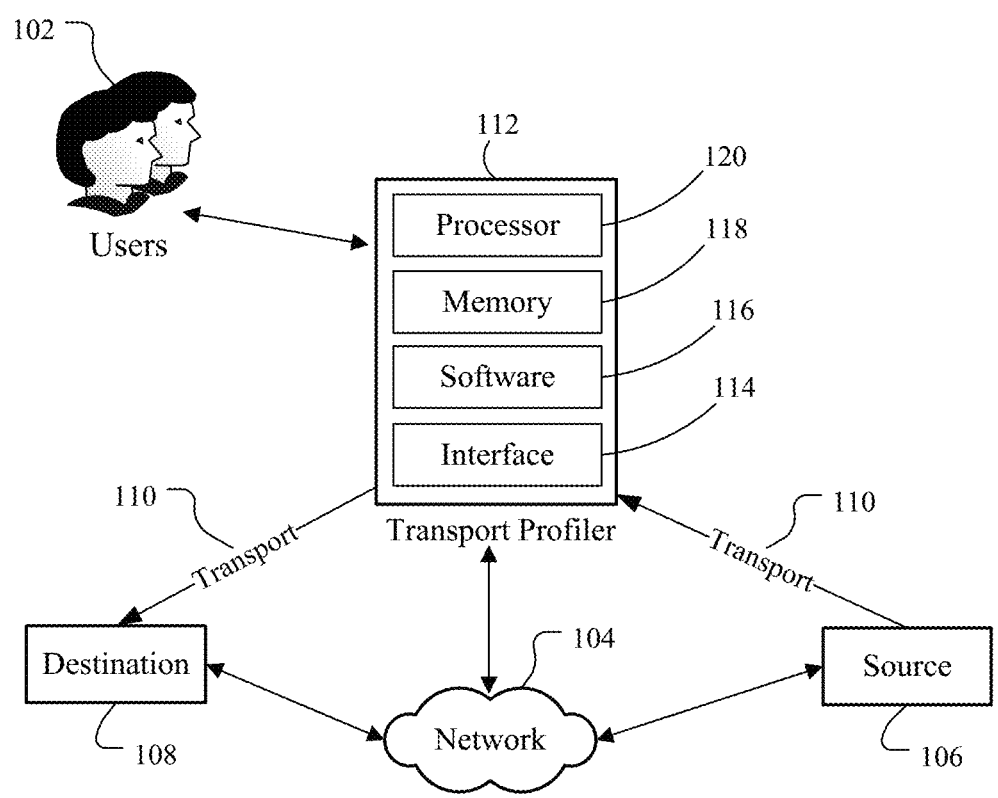
FIG. 1 illustrates a block diagram of an example network system.

FIG. 1 illustrates a block diagram of an example network system 100. The system 100 may be a business application, such as an ERP system. The system 100 may include functionality for verifying an update or change, such as in a transport 110 with a transport profiler 112. The transport 110 may be from a source 106 to a destination 108. The network system 100 may include a network 104 that interconnects any of the components. For example, the transport 110 may occur over the network 104. The network 104 may be an internal network, an external network, or a combination.

The transport profiler 112 may be a computing device operated by one or more users 102 for monitoring transports, such as the transport 110. In one embodiment, the transport profiler 112 may be software that runs on a computing device as shown in FIG. 1. The transport profiler 112 verifies each transport 110 from the source 106 and the destination 108. The transport profiler 112 may include a processor 120, a memory 118, software 116 and a user interface 114. In alternative embodiments, the transport profiler 112 may be multiple devices to provide different functions and it may or may not include all of the user interface 114, the software 116, the memory 118, and/or the processor 120.

The user interface 114 may be a user input device or a display. The user interface 114 may include a keyboard, keypad or a cursor control device, such as a mouse, or a joystick, touch screen display, remote control or any other device operative to allow a user or administrator to interact with the transport profiler 112. The user interface 114 may communicate with any of the systems in the network 104, including the transport profiler 112, the source 106, and/or the destination 108. The user interface 114 may include a user interface configured to allow a user and/or an administrator to interact with any of the components of the transport profiler 112 for checking and managing a transport. The user interface 114 may include a display coupled with the processor 120 and configured to display an output from the processor 120. The display (not shown) may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing data.

The processor 120 in the transport profiler 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program (i.e. software 116), such as code generated manually (i.e., programmed). The software 116 may include a verification and checking of the transport 110 to ensure the security of both the destination 108 and the source 106 as a result of the transport 110. This security verification and checking may be implemented from software, such as the software 116.

The processor 120 may be coupled with the memory 118, or the memory 118 may be a separate component. The software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded tracking data, or an analysis of the data. Examples include a hard drive, compact disc ("CD"), digital video disc ("DVD"), memory card, memory stick, floppy disc, universal serial bus ("USB") memory device, or any other device operative to store data. The memory 118 is operable to store instructions executable by the processor 120.

The functions, acts or tasks illustrated in the figures or described herein may be performed by the programmed processor executing the instructions stored in the software 116 or the memory 118. The functions, acts or tasks are independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing and the like. The processor 120 is configured to execute the software 116.

The present disclosure contemplates a computer-readable medium that includes instructions or receives and executes instructions responsive to a propagated signal, so that a device connected to a network can communicate voice, video, audio, images or any other data over a network. The user interface 114 may be used to provide the instructions over the network via a communication port. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly as discussed below. Likewise, the connections with other components of the system 100 may be physical connections or may be established wirelessly.

Any of the components in the system 100 may be coupled with one another through a (computer) network, including but not limited to the network 104. For example, the transport profiler 112 may be coupled with the source 106 and/or the destination 108 through the network 104. In some ERP systems, the network 104 may be a local are network ("LAN"), or may be a public network such as the Internet. Accordingly, any of the components in the system 100 may include communication ports configured to connect with a network. The network or networks that may connect any of the components in the system 100 to enable communication of data between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another.

The source 106 and the destination 108 are exemplary ERP systems in which the source 106 provides an update or change to be applied to the destination 108. Specifically, the source 106 and/or the destination 108 may be systems or sub-systems within a business application or ERP system. In one embodiments, the source 106 and/or the destination 108 may be databases within a business application or an ERP system. In other embodiments, one or more of the systems may be remote.

Within business application, a change in one system (e.g. the source 106) may need to be propagated into other systems (e.g. the destination 108). The update or change that is provided is referred to as the transport 110. The transport profiler 112 acts as a check or verification of the transport 110 to ensure correct operation after the transport 110 is applied. The destination 108 and/or the source 106 may be external from one another, may be directly connected, or may be part of the same network, such as the network 104. Specifically, the source 106 may be an external third-party provider that is providing the transport 110, so the transport profiler 112 inspects and verifies the transport 110 to prevent external attacks.

While the transport security may apply to transports in any business applications, in one embodiment, the business application is an ERP. Further, for SAP® as the ERP, the transport 110 may be a tool for transferring applications between systems. The destination system 108 cannot detect the application, so the transport profiler 112 can act as an intermediary to test the application on behalf of the destination system 108. The transport 110 may be submitted as part of a transport request that is a collection of changes to be made. In one embodiment, the transport profiler 112 analyzes the result of the planned transport 110. Accordingly, the transport may be a process that migrates one or multiple transport requests to a destination. The request may include information about the type of change, the purpose of the transport 110, a request category, and information about the destination system 108. The request may include multiple jobs or tasks to be performed with the destination system 108. In one embodiment, the tasks may include a list of objects that are modified. In one embodiment, the transport request may include one or multiple tasks and tasks may include a list of modified objects.

The transport 110 may include various changes that are tested in the destination 108, such as configuration changes. The transport profiler 112 may be able to test the transport 110 for the destination 108 to verify operation and ensure that the destination 108 will be stable with the transport 110. For example, code from the transport 110 may be analyzed by the transport profiler 112. U.S. Pat. Pub. No. 2019/0180035 and U.S. Pat. Nos. 8,402,547 and 10,025,688 describe embodiments of a Code Profiler that analyzes code for security vulnerabilities, each of which is hereby incorporated by reference.

In one embodiment, the transport 110 may be an SAP® transport for transferring data between SAP systems (e.g. the source/destination are SAP systems). This data may be part of the transport and may include any data for an SAP system. Exemplary data could be a printer driver or an entire SAP client. The data may be a change or an update. Accordingly, the transport may be referred to as providing a change or update to a destination system. Transports can also be used to transfer data from external applications. In other words, the source may include an external system or application.

The transport profiler 112 operates to validate the transport 110 for transportation to the destination system 108. The validation may include a check of consistency, completeness, and for identifying any critical changes. The analysis is performed before the transport is executed. The transport profiler 112 can offer protection against malicious attacks through automated functionality. The automated functionality may be fully integrated in the transport profiler 112 for analyzing each of the transports 110. For example, third party transports can be checked before importing, without having to import them into the destination system 108. Specifically, the transport profiler 112 can show what would happen when the transport 110 is completed. This can identify missing objects or identify when critical objects are being changed. In addition, the transport profiler 112 can automatically detects errors, prevent manipulation of data, prevent exportation of confidential data, and verify third party software is safe.

In one embodiment, the transport profiler 112 may be implemented with zero footprint. Users can provide requests for implementation by the transport profiler 112. The status of the transport profiler 112 may be managed by a user, as well as customization of options for the transport profiler 112. Additional transports may be continuously scanned and monitored. The transport profiler 112 may include a development stage and a quality assurance stage before allowing transport to the destination system 108. Each transport request can be scanned so that non-critical transport requests are provided to the destination system 108, while critical requests are further analyzed.

The transport 110 and its verification may be displayed as a status update. In one embodiment, the status may be illustrated in a visualization for the users 102. The visualization may be of transport dependency. The transport visualization can illustrate which changes are being applied with the transport 110 and illustrate results of those changes. The visualization may be displayed in the interface 114 for the users 102.

In one embodiment, the visualization may be for an analysis of multiple transports. For example, when a user starts an analysis of multiple transports and one of the transports has an issue, then the faulty transport can be removed from the transport list and there may be a new analysis of the remaining transports. This may be needed as the remaining transports maybe have dependencies to the removed transport. The transport inter-dependency may create issues without verifying that remaining transports after removing a faulty transport do not include issues. In one example, the removed transport may include a new table that is accessed by programs, included in the remaining transports. The follow up analysis of the remaining transports may identify new issues. The user may need to remove the transports that cause the new issues and restart an analysis of the remaining ones. This process may need to be repeated because of transport dependencies until there are no more issues found. The transport dependency analysis may be automated for users so that the transport profiler 112 can iteratively determine and display the final set of transports that can be implemented without issues.

Figure 2:
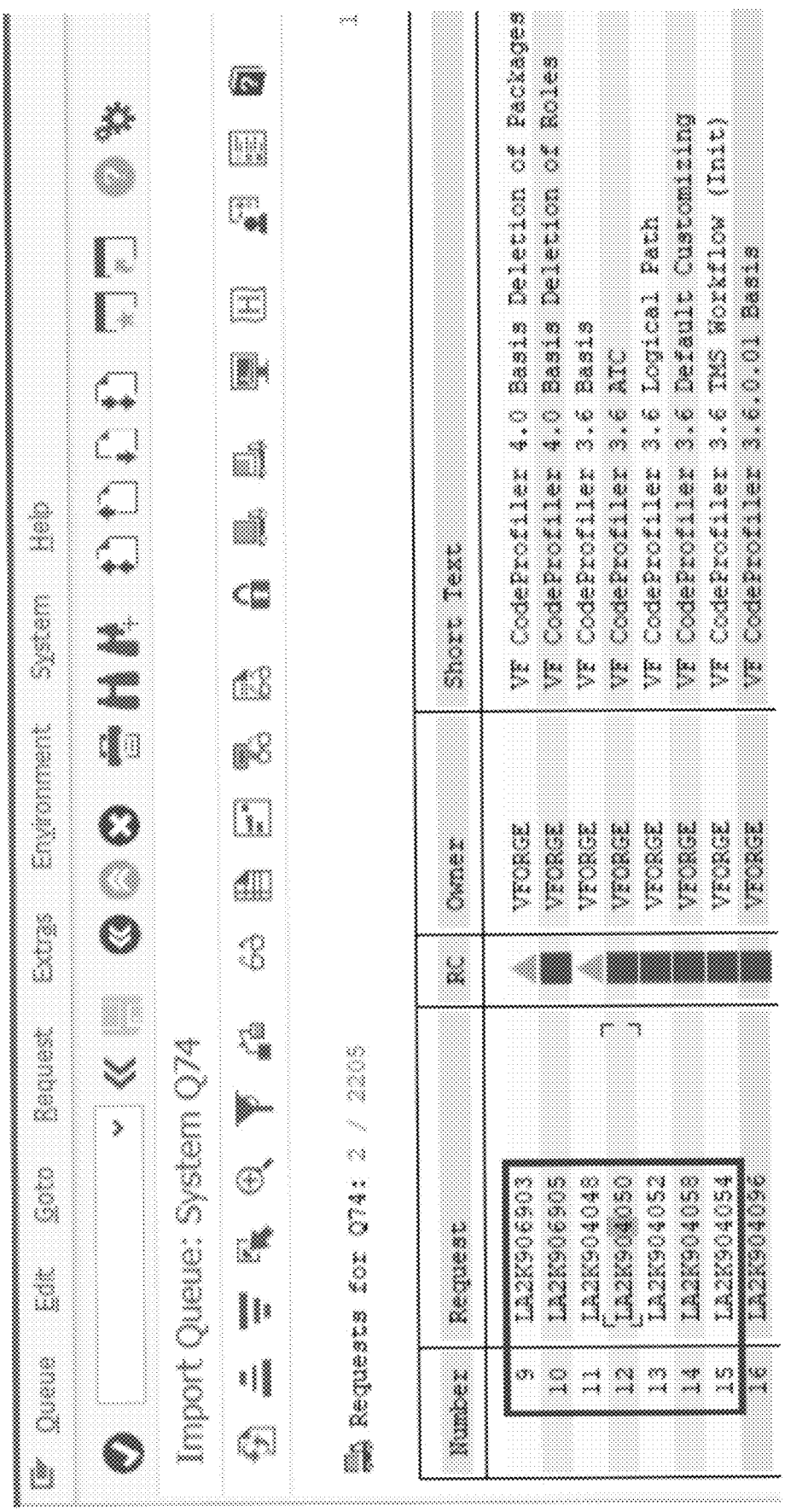
FIG. 2 illustrates issues with transport request dependencies.

FIG. 2 illustrates issues with transport request dependencies. For an import scenario, a system administrator may want to import multiple transport requests in one step. Before the import the administrator inspects the transports with the transport profiler and receives a mandatory finding for one transport. There may be an inspection of multiple transport requests before an import, which identifies an issue in one transport request. The result is one critical finding for one single transport request.

Figure 3:
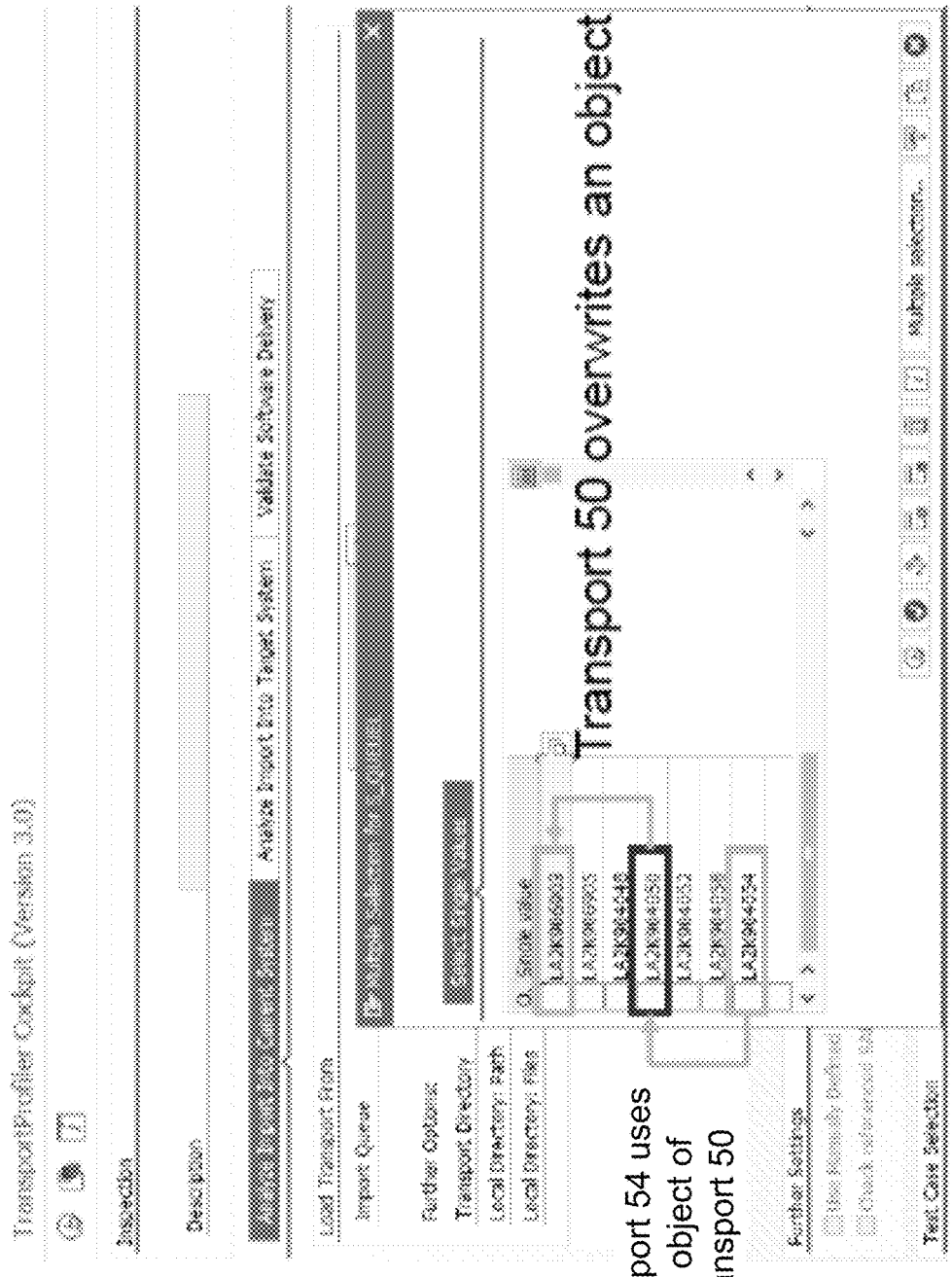
FIG. 3 illustrates transport request dependencies.

However, the transport request may have many dependencies. FIG. 3 illustrates transport request dependencies. Transport 54 uses an object from Transport 50. Transport 50 overwrites an object of Transport 03. This illustrates potential transport request dependencies. The result of an inspection of multiple transport requests can include a critical issue for one single transport. A dependent transport can use objects of the critical transport as shown in FIG. 3. For example, the critical transport may have a new version and overwrites an older one of another transport. One option is not to remove this transport, because other transports can have dependencies to that critical transport.

In one embodiment, the transport profiler solves the multiple dependency problem by removing the critical transport and re-inspecting the rest of the transports. The new inspection finds transports, which are dependent, using objects, of the removed transport. The result of the inspection can be a new list of transports with issues because of the dependency. A system administrator can start another inspection without the new-found transports with issues. This will continue iteratively until all transports have been analyzed to remove transports dependent on any transport with an issue. Accordingly, this iteration results in removal of the critical transport(s) and re-inspection of the rest of the transports repeatedly until all transports with dependencies to the critical transports are removed. This iteration works for transports with a usage relation. This iteration will determine and display a final set of transports that can be imported into a destination system without any issue. This final set of transports may be referred to as an import recommendation.

FIG. 4 illustrates an import recommendation. The import recommendation shown in FIG. 4 lists all object related dependencies between transport requests. That may include the dependency of objects that are: 1) used in other transport requests or change documents (ChaRM); and 2) overwritten through other transport requests (ChaRM).

Transport profiler 112 may be implemented as a zero footprint installation. Specifically, the transport profiler 112 may be only installed on a dedicated central system, rather than being install on each system (e.g. source/destination). When the transport profiler 112 is installed on a central system, the other systems (e.g. source/destination 106, 108) may require a small plugin that will trigger an analysis automatically at crucial phases during the transport process, such as before a transport leaves its source system and before a transport is imported into a destination system.

Figure 5:
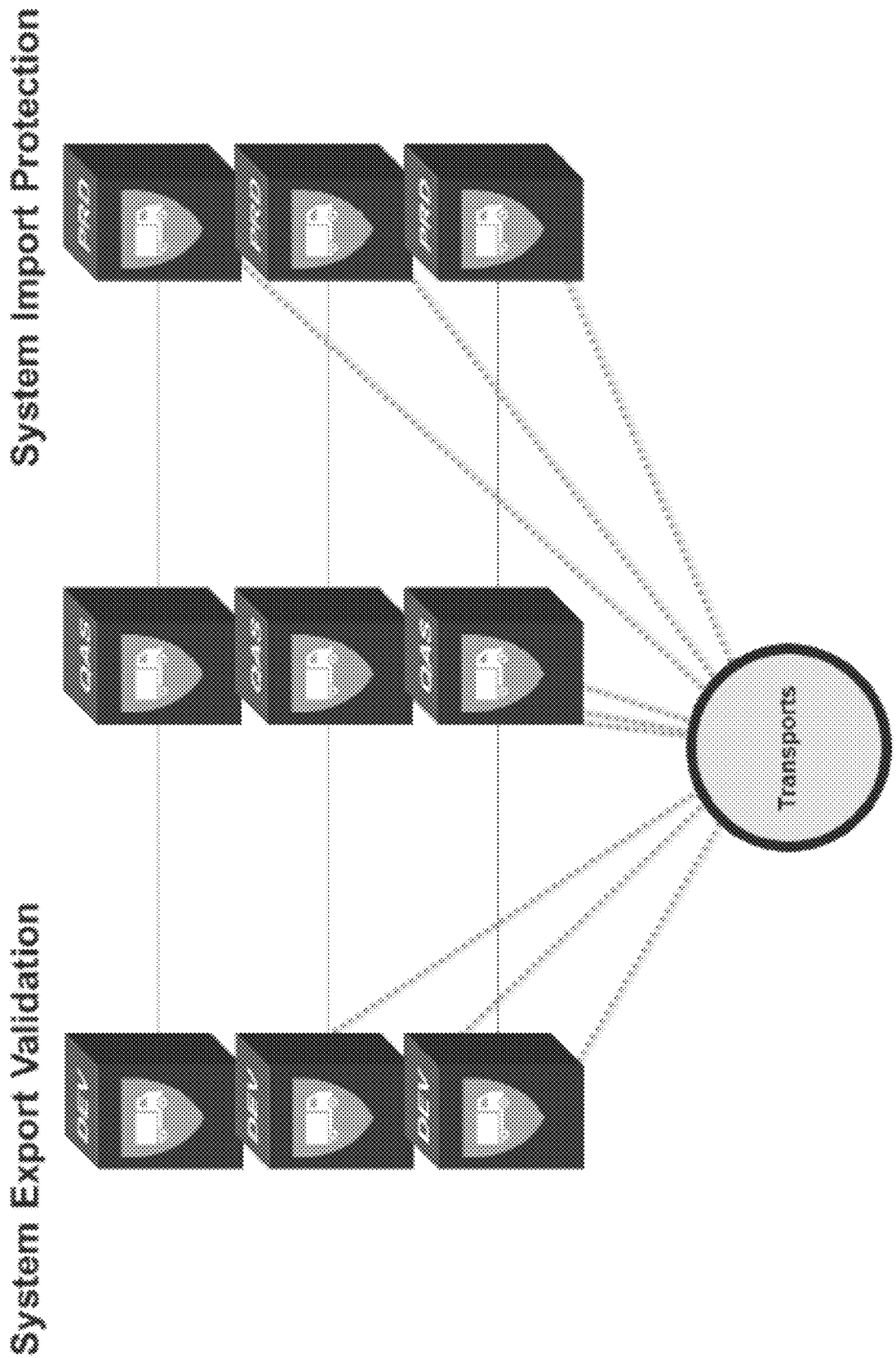
FIG. 5 illustrates a transport system.

FIG. 5 illustrates a transport system. The transport system may include separate 1) third party; 2) development; 3) quality assurance; and 4) production steps. Each system may have a separate transport installation. FIG. 5 illustrates system export validation developers, quality assurance (QAS), and system import protection (PRD) that each have access to the transports but have a separate transport installation.

Figure 6:
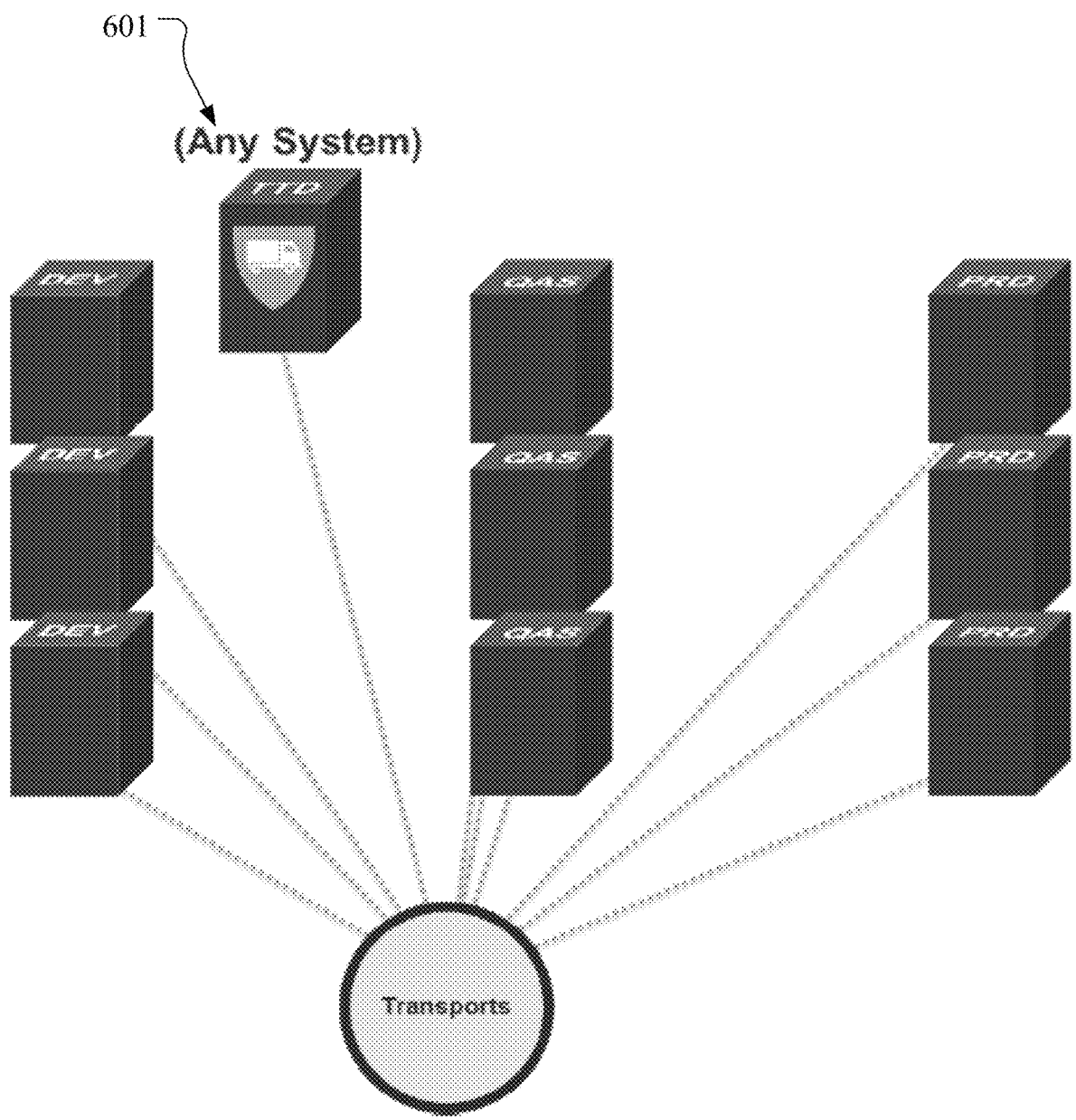
FIG. 6 illustrates a transport system with zero footprint.

FIG. 6 illustrates a transport system with zero footprint. The transport system software 601 is at a central location that can then be accessed by the other elements/systems. The transport system software 601 has access to the transports and can perform the analysis for transports between systems without being installed on those systems.

The meaning of specific details should be construed as examples within the embodiments and are not exhaustive or limiting the invention to the precise forms disclosed within the examples. One skilled in the relevant art will recognize that the invention can also be practiced without one or more of the specific details or with other methods, implementations, modules, entities, datasets, etc. In other instances, well-known structures, computer-related functions or operations are not shown or described in detail, as they will be understood by those skilled in the art.

The discussion above is intended to provide a brief, general description of a suitable computing environment (which might be of different kind like a client-server architecture or an Internet/browser network) in which the invention may be implemented. The invention will be described in general context of computer-executable instructions, such as software modules, which might be executed in combination with hardware modules, being executed by different computers in the network environment. Generally, program modules or software modules include routines, programs, objects, classes, instances, components, data structures, etc., that perform particular tasks or implement particular abstract data types. Computer-executable instructions, associated data structures and program modules represent examples of the program code means for executing steps of the method described herein. The particular sequence of such executable instructions, method steps or associated data structures only represent examples of corresponding activities for implementing the functions described therein. It is also possible to execute the method iteratively.

Those skilled in the art will appreciate that the invention may be practiced in a network computing environment with many types of computer system configurations, including personal computers (PC), hand-held devices (for example, smartphones), multi-processor systems, microprocessor-based programmable consumer electronics, network PCs, minicomputers, mainframe computers, laptops and the like. Further, the invention may be practiced in distributed computing environments where computer-related tasks are performed by local or remote processing devices that are linked (either by hardwired links, wireless links or by a combination of hardwired or wireless links) through a communications network. In a distributed computing environment, program modules may be located in local or remote devices, memory systems, retrievals or data storages.

Generally, the method according to the invention may be executed on one single computer or on several computers that are linked over a network. The computers may be general purpose computing devices in the form a conventional computer, including a processing unit, a system memory, and a system bus that couples various system components including system memory to the processing unit. The system bus may be any one of several types of bus structures including a memory bus or a memory controller, a peripheral bus and a local bus using any of a variety of bus architectures, possibly such which will be used in clinical/medical system environments. The system memory includes read-only memory (ROM) and random access memories (RAM). A basic input/output system (BIOS), containing the basic routines that have the functionality to transfer information between elements within the computer, such as during start-up, may be stored in one memory. Additionally, the computer may also include hard disc drives and other interfaces for user interaction. The drives and their associated computer-readable media provide non-volatile or volatile storage of computer executable instructions, data structures, program modules and related data items. A user interface may be a keyboard, a pointing device or other input devices (not shown in the figures), such as a microphone, a joystick, a mouse. Additionally, interfaces to other systems might be used. These and other input devices are often connected to the processing unit through a serial port interface coupled to system bus. Other interfaces include a universal serial bus (USB). Moreover, a monitor or another display device is also connected to the computers of the system via an interface, such as video adapter. In addition to the monitor, the computers typically include other peripheral output or input devices (not shown), such as speakers and printers or interfaces for data exchange. Local and remote computer are coupled to each other by logical and physical connections, which may include a server, a router, a network interface, a peer device or other common network nodes. The connections might be local area network connections (LAN) and wide area network connections (WAN) which could be used within intranet or internet. Additionally, a networking environment typically includes a modem, a wireless link or any other means for establishing communications over the network.

Moreover, the network typically comprises means for data retrieval, particularly for accessing data storage means like repositories, etc. Network data exchange may be coupled by means of the use of proxies and other servers.

The example embodiments are to be considered in all respects only as illustrative and not restrictive. The scope of the invention is, therefore, indicated by the appended claims rather than by this description. All changes which come within the meaning and range of equivalency of the claims are to be embraced within their scope.

The invention claimed is:

1. A method for analyzing multiple transports comprising:
identifying a critical transport from the multiple transports, wherein the critical transport comprises one of the multiple transports with critical changes;
removing the critical transport;
determining, using objects from the multiple transports, which of the multiple transports are dependent on the critical transport, wherein any of the multiple transports that share any of the objects with the critical transport are determined to be dependent and also identified as another critical transport;
iteratively repeating the removing and determining steps for the identified another critical transport, wherein additional dependent transports are determined from the another critical transport and the removing and determining are iteratively repeated until the determining fails to determine any additional critical transports; and
providing, when there are no additional critical transports, an import recommendation for the multiple transports, wherein the import recommendation comprises all of the multiple transports that were not determined to be dependent or identified as a critical transport.

2. The method of claim 1, wherein the iteratively repeating continues until there are no determined dependent transports.

3. The method of claim 1, wherein there are no additional critical transports when the iteratively repeating is finished.

4. The method of claim 1, wherein the objects from the multiple transports comprises any objects that are modified by a respective transport, wherein the determining comprises determining which of the multiple transports correspond with objects being modified.

5. The method of claim 1, wherein the determining which of the multiple transports are dependent comprises generating a list of transports with potential issues due to the transport.

6. The method of claim 1, wherein each of the multiple transports has a usage relation.

7. The method of claim 1, wherein the identifying the critical transport comprises identifying consistency and completeness for each of the multiple transports.

8. The method of claim 4, wherein the determining comprises:
identifying any of the objects that are a critical object;
compiling a list of object related dependency; and
determining which of the multiple transports modify the identified objects, wherein any of the multiple objects that modify the identified objects are determined to be dependent.

9. In a business application, a computer system for verifying a transport, comprising:
a source computer system configured to provide a plurality of transports;
a destination computer system coupled with the source computer system to receive the transports from the source computer system; and
a transport profiler configured to analyze the transports prior to transmission from the source computer system to the destination system, wherein the analysis of the transports comprises:
identifying a critical transport from the transports, wherein the critical transport comprises one of the transports with critical changes;
removing the critical transport from the transports;
determining, using objects from the transports that have been modified, which of the transports are dependent on the critical transport, wherein any of the other transports that share any of the objects with the critical transport are determined to be dependent and identified as another critical transport; and
iteratively repeating the removing and determining steps for the identified another critical transport, wherein additional dependent transports are determined from the another critical transport and the removing and determining are iteratively repeated until the determining fails to determine any additional critical transports.

10. The computer system of claim 9, wherein the business application comprises at least one of Customer Relationship Management (CRM), Supplier Relationship Management (SRM), Supply Chain Management (SCM), Product Lifecycle Management (PLM), Human Capital Management (HCM), Integration Platforms, Business Warehouse (BW), Business Intelligence (BI), or enterprise resource planning (ERP).

11. The computer system of claim 9, wherein the business application comprises a software application that comprises at least one of SAP software, Oracle software, Microsoft software, Siebel software, JD Edwards software, Salesforce, Workday, Netsuite, or PeopleSoft software.

12. The computer system of claim 9, wherein the iteratively repeating continues until there are no determined dependent transports or critical transports.

13. The computer system of claim 12, wherein the analysis further comprises:
providing an import recommendation for the multiple transports after the iteratively repeating is finished.

14. The computer system of claim 12, wherein the objects from the multiple transports comprises any objects that are modified by a respective transport, wherein the determining comprises determining which of the multiple transports correspond with objects being modified.

15. The computer system of claim 12, wherein the determining which transports are dependent comprises generating a list of transports with potential issues due to the transport.

16. The computer system of claim 12, wherein the determining comprises:
 identifying any of the objects that are a critical object;
 compiling a list of object related dependency; and
 determining which of the multiple transports modify the identified objects, wherein any of the multiple objects that modify the identified objects are determined to be dependent.

17. A method for verifying a transport in a business application, the method comprising:
 preparing to provide, from a source computer system to a destination computer system, a transport;
 verifying, with a transport profiler, operation of the destination computer system with the transport, wherein a plug-in is installed at both the source computer system and the destination computer system, wherein the plug-in is for the verifying of the transport, further wherein the transport profiler is stored in a central computer system separate from the source computer system and the destination computer system;
 removing the transport when the verifying cannot confirm the transport operates with the destination computer system; and
 receiving, at a destination computer system, the transport when the verifying confirms the transport operates with the destination computer system.

18. The method of claim 17, wherein the transport profiler comprises zero footprint by being stored in the central system and is not stored at the source computer system and not stored at the destination computer system.

19. The method of claim 17, wherein the business application comprises a software application.

20. The method of claim 19, wherein the software application comprises at least one of Customer Relationship Management (CRM), Supplier Relationship Management (SRM), Supply Chain Management (SCM), Product Lifecycle Management (PLM), Human Capital Management (HCM), Integration Platforms, Business Warehouse (BW), Business Intelligence (BI), or enterprise resource planning (ERP).

* * * * *